Patented Jan. 22, 1935

1,988,438

UNITED STATES PATENT OFFICE 1,988,438

PROCESS FOR VULCANIZING RUBBER AND PRODUCTS OBTAINED THEREBY

Sidney M. Cadwell, Grosse Pointe Village, Mich., assignor, by mesne assignments, to United States Rubber Company, New York, N. Y., a corporation of New Jersey No Drawing. Original application November 1, 1926, Serial No. 145,718. Divided and this application September 3, 1931, Serial No. 561,004

9 Claims. (Cl. 18—53)

The present invention relates to the treatment of rubber with various reaction products of aldehyde amine condensation products, and particularly to the preparation of halogen containing aldehyde amines. The invention is also concerned with improving the vulcanization-accelerating power of such condensation products by treatment with halogens or with halogen acids. This case is a division of Serial No. 145,718, filed November 1, 1926, now U. S. Patent No. 1,852,444.

As one illustration of a method of preparing one of these halogen-containing condensation products, a hydrogen chloride derivative of heptaldehyde aniline may be prepared by dissolving 20 parts by weight of the heptaldehyde aniline in twice its volume of dry ether, and then treating with dry hydrogen chloride gas for about 4 hrs., keeping the reaction mixture cooled with ice. After the mixture has become saturated, the ether may be removed by vacuum distillation, and the excess of hydrochloric acid may be eliminated by passing air through the reaction mixture. The reaction product is a viscous mass having an agreeable smell. One gram of it will absorb all the iodine in 58.2 cc. of N/10 iodine in benzol. A rubber compound containing 100 parts by weight of rubber, 10 of zinc oxide, 3 of sulphur and .1 part of this hydrogen chloride reaction product will give a tensile strength of 2875 lbs. per sq. in. in 60 minutes vulcanization at 40 lbs. steam pressure. This reaction product may also be prepared by introducing dry hydrogen chloride into the heptaldehyde aniline condensation product directly. One gram of the reaction product prepared in this manner will absorb the iodine in approximately 56.2 ccs. of N/10 iodine.

In a further form of the invention the accelerator employed in the treatment of rubber is prepared by shaking 101.6 grams of heptaldehyde-aniline with 117 grams of 36% hydrochloric acid, the mixture being then boiled in an oil bath for about 2½ to 5½ hrs. under a reflux condenser. The oily layer may be washed several times with an equal weight of water, and it will be observed that the first three wash waters are slightly colored. The fourth, fifth, sixth, seventh, eighth and ninth wash waters show a gain in weight and in addition are deeply colored by some soluble material. Upon acidification of these (fourth to ninth) combined wash waters, an oil separates out, one gram of which will absorb the iodine in 45.5 ccs. of N/10 iodine in benzol. In the above rubber compound $\frac{1}{10}$ part of this reaction product will upon vulcanization for 60 min. at 40 lbs. steam pressure, give a tensile strength of 3165 lbs. If the amount be increased to .25 part of accelerating product, the tensile strength is about 4165 lbs. in the same time and at the same temperature.

Instead of using 36% hydrochloric acid excellent results have been obtained by employing 33% sulphuric acid in the above procedure.

Instead of treating the derivative in the above wash waters with acid, one may treat the above waters with aqueous sodium hydroxide, whereupon oil separates out which has an odor resembling iso nitrile. One gram of this oil absorbs 75 cc. of N/10 iodine in benzol. .05 of a part of this material when used in the formula given above and vulcanized for 30' under 40 pounds steam pressure gave a tensile of 3020. .025 of a part of this material when used as above gave a tensile of 2830 after 60' under 40 pounds steam pressure. It will be observed that this is one part of accelerator for 4000 parts of rubber. It is believed that this is the most powerful accelerator that has ever been produced.

It will be observed that the formation of these halogen containing reaction products or derivatives will result in an increase in the accelerating value of the aldehyde amine. The invention is not limited to any particular proportion of aldehyde and amine in the condensation products, but contemplates the use of such condensation products in which the amount of aldehyde or amine may be varied within the known limits. The invention also aims to include the halogen containing reaction products or derivatives of aldehyde amines in which the aldehyde portion may comprise more than one aldehyde. The condensation products which are utilized herein may be prepared in any desired manner, and as stated above the constituents may be in any suitable proportions, the combination of aldehyde and amine being effected in one reaction or in several reactions in any well-known manner.

The accelerating products of the present invention may be added to rubber on the mixing mill in the usual manner, or may be introduced into solid rubber in any other suitable way, or into rubber solutions or dispersions including aqueous dispersions of rubber, either artificial or natural.

Having thus described my invention, what I claim and desire to protect by Letters Patent is:

1. As a new class of compounds suitable for use in the vulcanization of rubber, the products obtained from treating a preformed heptaldehyde and aniline condensation product with a strong mineral acid.

2. As a compound suitable for use in the vulcanization of rubber, the product obtained from treating a preformed heptaldehyde-aniline condensation product with hydrogen chloride in the form of a dry gas, and removing excess hydrogen chloride.

3. As a compound suitable for use in the vulcanization of rubber, the oily product obtained from refluxing a preformed condensation product of heptaldehyde and aniline with hydrogen chloride, washing with water, and treating the wash water with acid to effect the separation of an oily product therefrom, and recovering said oily product.

4. As a compound suitable for use in the vulcanization of rubber, the oily product obtained from refluxing a preformed condensation product of heptaldehyde and aniline with hydrogen chloride, washing with water, and treating the wash water with alkali to effect the separation of an oily product therefrom, and recovering said oily product.

5. Process of treating rubber which comprises vulcanizing rubber in the presence of the oily product obtained by refluxing a preformed condensation product of heptaldehyde and aniline with a strong mineral acid, washing with water and treating the wash water with acid to effect the separation of an oily product therefrom, and recovering said oily product.

6. Process for treating rubber which comprises combining therewith sulphur and a product obtained from treating a preformed heptaldehyde and aniline condensation product with hydrogen chloride, and vulcanizing the rubber.

7. A vulcanized rubber product derived from rubber combined with sulphur and a product obtained from treating a preformed heptaldehyde and aniline condensation product with hydrogen chloride.

8. Process of treating rubber which comprises vulcanizing rubber in the presence of the oily product obtained by refluxing a preformed condensation product of heptaldehyde and aniline with a strong mineral acid, washing with water and treating the wash water with alkali to effect the separation of an oily product therefrom, and recovering said oily product.

9. The process of treating rubber which comprises vulcanizing rubber in the presence of a product obtained from treating a preformed heptaldehyde-aniline condensation product with hydrogen chloride in the form of a dry gas, and removing excess hydrogen chloride.

SIDNEY M. CADWELL.